(12) United States Patent
Pillsbury et al.

(10) Patent No.: US 11,748,438 B2
(45) Date of Patent: *Sep. 5, 2023

(54) CUSTOMIZABLE REDAPTOR EXTENSIONS FOR SINGLE-PAGE WEB APPLICATIONS

(71) Applicant: Cisco Technology, Inc., San Jose, CA (US)

(72) Inventors: Deon Anthony Pillsbury, Apex, NC (US); Felipe de Mello, Holly Springs, NC (US); David C. White, Jr., St. Petersburg, FL (US); Necati Cehreli, Elewijt (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,228

(22) Filed: Oct. 19, 2022

(65) Prior Publication Data

US 2023/0041883 A1 Feb. 9, 2023

Related U.S. Application Data

(63) Continuation of application No. 17/069,173, filed on Oct. 13, 2020.

(51) Int. Cl.
*G06F 8/61* (2018.01)
*G06F 16/957* (2019.01)
(Continued)

(52) U.S. Cl.
CPC ............ *G06F 16/9574* (2019.01); *G06F 8/61* (2013.01); *G06F 9/44521* (2013.01);
(Continued)

(58) Field of Classification Search
CPC .. G06F 16/9574; G06F 16/986; G06F 40/103; G06F 8/61; G06F 9/44521;
(Continued)

(56) References Cited

U.S. PATENT DOCUMENTS 8,200,962 B1 6/2012 Boodman et al.
8,924,845 B2 * 12/2014 Hagerott ................. G06F 9/451
715/234

(Continued)

FOREIGN PATENT DOCUMENTS

CN 102830997 A 12/2012
CN 109783154 A 5/2019

OTHER PUBLICATIONS

Title: An architectural style for Ajax author: A Mesbah, published on 2007.*

(Continued)

*Primary Examiner* — Chameli Das
(74) *Attorney, Agent, or Firm* — Edell, Shapiro & Finnan, LLC

(57) ABSTRACT

A method, computer system, and computer program product are provided for modifying a web application at runtime. A single-page web application is loaded by a web browser of a client, wherein the single-page web application exchanges data between the client and a server. An extension for the single-page web application is obtained. The extension is applied to the single-page web application, wherein applying the extension adds a new feature, or modifies an existing feature, of the single-page web application without reloading the single-page web application.

20 Claims, 8 Drawing Sheets

(51) Int. Cl.
*H04L 67/025* (2022.01)
*H04L 67/00* (2022.01)
*G06F 9/445* (2018.01)
*G06F 40/103* (2020.01)
*G06F 16/958* (2019.01)
*H04L 67/75* (2022.01)

(52) U.S. Cl.
CPC ........ *G06F 9/44526* (2013.01); *G06F 16/986* (2019.01); *G06F 40/103* (2020.01); *H04L 67/025* (2013.01); *H04L 67/34* (2013.01); *H04L 67/75* (2022.05)

(58) Field of Classification Search
CPC ... G06F 9/44526; H04L 67/75; H04L 67/025; H04L 67/34
USPC .......................................... 717/111; 715/234
See application file for complete search history.

(56) References Cited

U.S. PATENT DOCUMENTS

| | | | |
|---|---|---|---|
| 9,275,247 B2* | 3/2016 | Pearson | H04L 67/306 |
| 10,262,046 B2* | 4/2019 | Andrews | H04L 67/10 |
| 11,188,353 B2 | 11/2021 | Byard et al. | |
| 11,379,102 B1* | 7/2022 | Brannam | H04L 67/125 |
| 11,385,772 B2 | 7/2022 | Masuda et al. | |
| 2005/0086344 A1 | 4/2005 | Suesserman | |
| 2008/0235143 A1 | 9/2008 | Beller et al. | |
| 2009/0259940 A1 | 10/2009 | Moraes | |
| 2013/0191823 A1 | 7/2013 | Davidson et al. | |
| 2014/0020053 A1 | 1/2014 | Kay et al. | |
| 2014/0172945 A1 | 6/2014 | Hershberg et al. | |
| 2014/0280691 A1 | 9/2014 | Buerner | |
| 2015/0127717 A1 | 5/2015 | Teibel et al. | |
| 2017/0212735 A1 | 7/2017 | Levi et al. | |
| 2018/0062956 A1* | 3/2018 | Schultz | G06F 16/214 |
| 2018/0316587 A1 | 11/2018 | Gandhi et al. | |
| 2018/0341369 A1* | 11/2018 | Johnston | G06F 16/2228 |
| 2021/0105340 A1 | 4/2021 | Grozdanov et al. | |
| 2022/0166825 A1 | 5/2022 | Jaiswal et al. | |
| 2022/0179665 A1* | 6/2022 | Rathod | G06F 9/451 |

OTHER PUBLICATIONS

Title: Performance of javascript frameworks on web single page applications (SPA), author: H Findel Dávila, published on 2015.*
Tristan Greene, "Comcast continues to inject its own code into websites you visit," https://thenextweb.com/news/comcast-continues-to-inject-its-own-code-into-websites-you-visit, Dec. 11, 2017, 6 pages.
Snyder, C., "How to Change Your Browser's User Agent Without Installing an Extension," https://helpdeskgeek.com/how-to/how-to-change-your-browsers-user-agent-without-installing-an-extension/, Oct. 2, 2019, 13 pages.
Bitovi, "Designing Configurable Interfaces," https://www.bitovi.com/blog/designing-configurable-interfaces, Aug. 26, 2015, 17 pages.
Bolin et al., "Automation and Customization of Rendered Web Pages," https://doi.org/10.1145/1095034.1095062, MIT CSAIL, UIST'05, Oct. 2005, 10 pages.
Amiri et al., "DBProxy: A dynamic data cache for Web applications," Research output: Contribution to conference > Paper > peer-review, https://yonsei.pure.elsevier.com/en/publications/dbproxy-a-dynamic-data-cache-for-web-applications, retrieved Aug. 2022, 11 pages.
Mukhiya et al., "An Architectural Style for Single Page Scalable Modern Web Application," International Journal of Recent Research Aspects ISSN: 2349-7688, vol. 5, Issue 4, Dec. 2018, 9 pages.
Miarchetto et al., "A case study-based comparison of web testing techniques applied to AJAX web applications," International Journal on Software Tools for Technology Transfer vol. 10, published Oct. 17, 2008, 16 pages.
Conallen, J., "Modeling Web Application Architectures with UML," Modeling business logic in Web-specific components can be done in a coherent and consistent way, Communications of the ACM, vol. 42, No. 10, Oct. 1999, 8 pages.

* cited by examiner

CUSTOMIZABLE REDAPTOR EXTENSIONS FOR SINGLE-PAGE WEB APPLICATIONS

CROSS REFERENCE TO RELATED APPLICATION

This application claims priority to U.S. Non-Provisional application Ser. No. 17/069,173, filed Oct. 13, 2020, entitled "Customizable Redaptor Extensions for Single-Page Web Applications," the entirety of which is incorporated herein by reference.

TECHNICAL FIELD

The present disclosure relates to web applications, and more specifically, to customizable extensions for single page web applications.

BACKGROUND

Single-page web applications, also known as single page applications, are software applications that run on web servers and are accessed by users through web browsers. Typically, single-page web applications present information to a user by dynamically rewriting the current web page with new data that is obtained from a web server. Thus, single-page web applications can present a user interface, via a web browser, that does not require the browser to load a new web page in order to modify aspects the user interface.

DESCRIPTION OF EXAMPLE EMBODIMENTS

Overview

Figure 1:
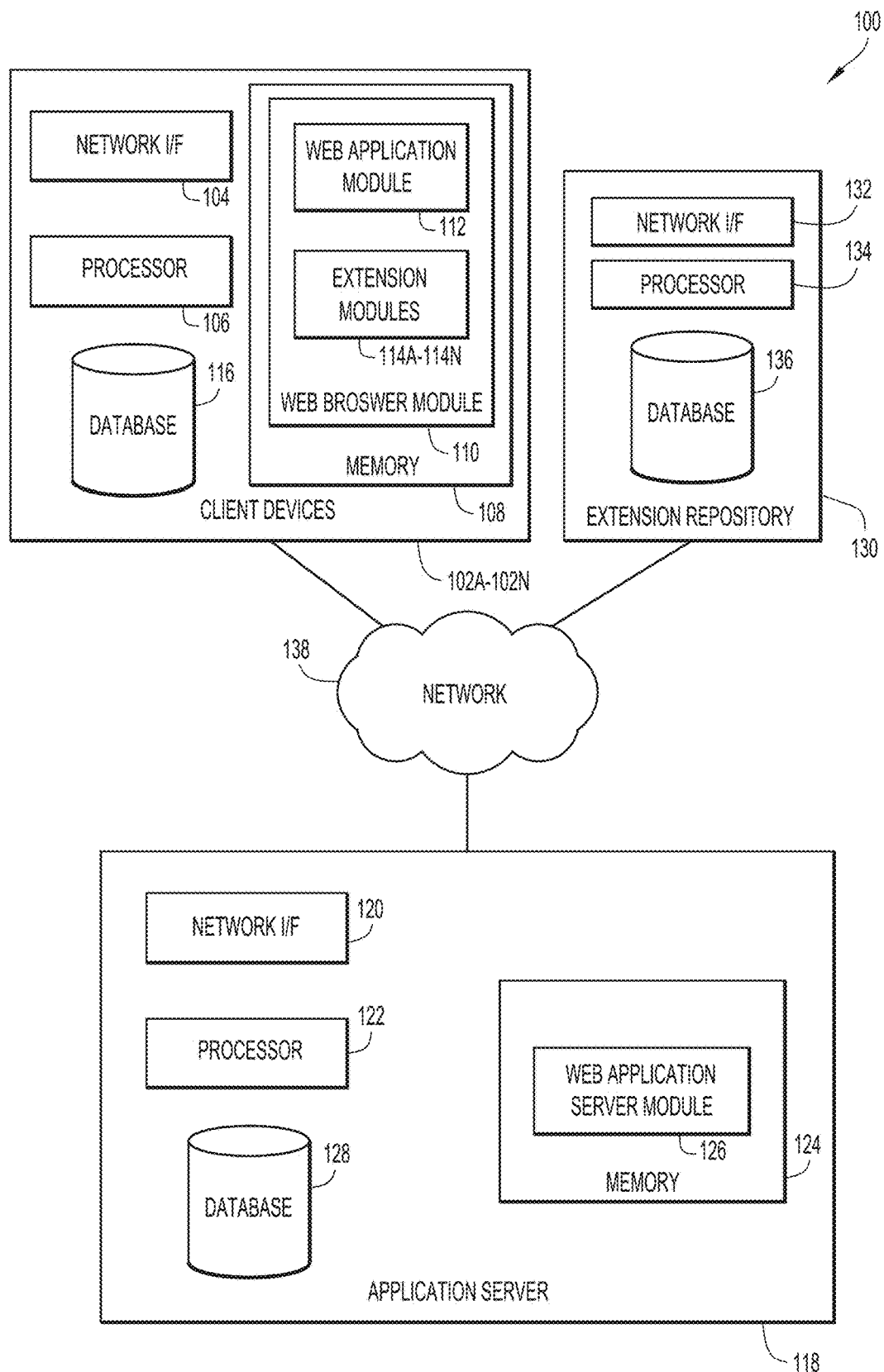
FIG. 1 is a block diagram depicting an environment for implementing extensions in single-page web applications, in accordance with an example embodiment.

According to one embodiment, techniques are provided for modifying a web application at runtime. A single-page web application is loaded by a web browser of a client, wherein the single-page web application exchanges data between the client and a server. An extension for the single-page web application is obtained. The extension is applied to the single-page web application, wherein applying the extension adds a new feature, or modifies an existing feature, of the single-page web application without reloading the single-page web application.

Example Embodiments

Embodiments are provided for web application extensions, and more specifically, to customizable extensions for single page web applications.

Single-page web applications, also referred to as single page applications, are designed to eliminate web browser page reloads to enable fluid user interactions. A single-page web application may be accessed via a web server, which provides code to a web browser of a user device for execution. Unlike other web application, which fetch and load pre-rendered pages from a web server, a single-page web application dynamically rewrites the contents of a single page to seamlessly deliver content to a user. Thus, single-page web applications avoid interruptions that are caused when pages from a server are rendered.

Browser extensions can modify or customize aspects of web pages, including the web page of a web application. Typically, a browser extension is installed into a web browser of a computing device, which involves an executable installer writing data to a storage device of the computing device, such as a hard disk drive or other non-volatile storage medium. Moreover, when a browser extension is installed, a web page is reloaded in order for the functionality of the browser extension to take effect. Thus, when a conventional browser extension is installed and applied to a single-page web application, the page needs to be reloaded, which disrupts the normally-seamless user experience provided by the single-page web application.

Thus, the embodiments presented herein enable extensions to be implemented in single-page web applications in a manner that does not disrupt the single-page web application. In particular, an extension can arbitrarily modify any aspect of a single-page web application, such as adding new functionalities, changing user interface elements, etc., without necessitating a reload of the page. Moreover, unlike conventional browser plug-ins, the embodiments presented herein do not require installation, and can be automatically implemented on other devices and/or browsers of a user.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Embodiments are now described in detail with reference to the figures. FIG. 1 is a block diagram depicting an environment 100 for implementing extensions in single-page web applications in accordance with an example embodiment. As depicted, environment 100 includes one or more client devices 102A-102N, an application server 118, an extension repository 130, and a network 138. It is to be understood that the functional division among components of environment 100 have been chosen for purposes of explaining various embodiments and is not to be construed as a limiting example.

Client devices 102A-102N each include a network interface (I/F) 104, at least one processor 106, memory 108, and storage 116. Memory 108 includes a web browser module 110, which includes a web application module 112 and extension modules 114A-114N. Each client device 102A-102N may include a laptop computer, a tablet computer, a netbook computer, a personal computer (PC), a desktop computer, a personal digital assistant (PDA), a smart phone, a thin client, or any programmable electronic device capable of executing computer readable program instructions. Moreover, the client devices 102A-102N may be virtual in the sense that they are embodied as software running on a computing device. Network interface 104 enables each client device 102A-102N to send and receive data over a network, such as network 138. In general, client devices 102A-102N may perform any computing task, including tasks relating to single-page web applications, such as transmitting, receiving, presenting, and/or processing of data obtained from, or provided to, client devices 102A-102N, application server 118, extension repository 130, and/or any other network-accessible computing resources. Each client device 102A-102N may include internal and external hardware components, as depicted and described in further detail with respect to FIG. 8.

Web browser module 110, web application module 112, and extension modules 114A-114N may include one or more modules or units to perform various functions of the embodiments described below. Web browser module 110, web application module 112, and extension modules 114A-114N may be implemented by any combination of any quantity of software and/or hardware modules or units, and may reside within memory 108 of any of client devices 102A-102N for execution by a processor, such as processor 106.

Web browser module 110 may present web pages to a user of client devices 102A-102N. For example, web browser module 110 retrieve content from network-accessible resources, such as application server 118, and may present the content to a user of client devices 102A-102N. Web browser module 110 may access information via a user-provided Uniform Resource Locator (URL), and may render accessed data as a web page. In order to render a web page, web browser module 110 may render pages using input in the form of one or more codes or languages, such as HyperText Markup Language (HTML), Extensible Markup Language (XML), JavaScript, Cascading Style Sheets (CSS), and the like.

Web application module 112 includes a web application, such as a single-page web application, that is executed by web browser module 110. The code of web application module 112 may initially be obtained from a server (e.g., application server 118), and web application module 112 may exchange information with the server during execution. For example, web application module 112 may obtain and present data from web application server module 126 of application server 118, and/or web application module 112 may obtain user input or requests at client devices 102A-102N and provide the user input or requests to web application server module 126. In some embodiments, web application module 112 presents a single-page web application in which elements are dynamically updated or modified to present new or different data to a user without requiring web browser module 110 to reload the page presented by web application module 112.

Extension modules 114A-114N interact with web application module 112 to modify the functionality of web application module 112 in some manner. As used herein, the extensions provided by extensions module 114A-114N may alternatively be referred to as "redaptors" or "reactive-adaptors" as the extensions may be reactively loaded and unloaded from a web application. Extension modules 114A-114N may be provided by the server that is associated with the web application modified by the extension (e.g., provided by application server 118), and/or extension modules 114A-114N may be provided by one or more third parties. In some embodiments, extension modules 114A-114N are obtained from extension repository 130.

User settings relating to extension modules 114A-114N may be saved client-side and/or server-side (e.g., stored by client devices 102A-102N and/or application server 118) so that when a user loads a web application in the future on a same or other device, previously-used extension modules 114A-114N will automatically be obtained and implemented. In some embodiments, extension modules 114A-114N execute in a same runtime environment as web application module 112. Extension modules 114A-114N may not be stored locally in non-volatile storage of client devices 102A-102N, but may rather be fetched each time that web application module 112 is initiated, and stored temporarily in memory 108.

Extension modules 114A-114N can modify any aspect of the operation of web application module 112. In various embodiments, extension modules 114A-114N may add, remove, or replace user interface elements, and/or add, remove, or replace functions of web application module 112. For example, extension modules 114A-114N may change the appearance or style of a web application's user interface, may add a new input field, may populate a drop-down menu with new items, or may provide a new function that utilizes an application programming interface (API) to access and present information from other network-accessible resources.

Extension modules 114A-114N may modify a web application without necessitating a reload of the page in which the web application is presented by injecting code into the rendered page. For example, an extension module can automatically inject JavaScript and/or new HTML Document Object Model (DOM) nodes into the page of a web application. Extension modules 114A-114N may save user settings so that when an extension is loaded in the future, the user's particular configuration settings for the extension will be automatically applied.

Storage 116 may include any non-volatile storage media known in the art. For example, storage 116 can be implemented with a tape library, optical library, one or more independent hard disk drives, or multiple hard disk drives in a redundant array of independent disks (RAID). Similarly, data in storage 116 may conform to any suitable storage architecture known in the art, such as a file, a relational database, an object-oriented database, and/or one or more tables. Storage 116 may store data relating to web browser module 110, including executables, and may store user settings relating to web browser module 110, web application module 112, and/or extension modules 114A-114N, including metadata specifying which extensions are enabled by a user for a particular web application, and any user-specified configuration settings for enabled extensions.

Application server 118 includes a network interface (I/F) 120, at least one processor 122, memory 124, and database 128. Memory 124 stores software instructions for a web application server module 126. Application server 118 may include a rack-mounted server, or any other programmable electronic device capable of executing computer readable program instructions. Network interface 120 enables components of application server 118 to send and receive data over a network, such as network 138. In general, application server 118 provides web applications to user devices, including back-end support for the web applications, server-side execution of aspects of web applications, exchange of data with web applications, and the like. Application server 118 may include internal and external hardware components, as depicted and described in further detail with respect to FIG. 8.

Web application server module 126 may include one or more modules or units to perform various functions of the embodiments described below. Web application server module 126 may be implemented by any combination of any quantity of software and/or hardware modules or units, and may reside within memory 124 of application server 118 for execution by a processor, such as processor 122.

Web application server module 126 may provide server-side support for pages of web applications that are loaded on client devices 102A-102N. For example, web application server module 126 may receive user input or requests from client devices 102A-102N, process the input or requests, and provide a response to client devices 102A-102N. As another example, web application server module 126 may execute queries on data stored in database 128 and provide results back to a requesting web application.

Database 128 may include any non-volatile storage media known in the art. For example, database 128 can be implemented with a tape library, optical library, one or more independent hard disk drives, or multiple hard disk drives in a redundant array of independent disks (RAID). Similarly, data in database 128 may conform to any suitable storage architecture known in the art, such as a file, a relational database, an object-oriented database, and/or one or more tables. Database 128 may store data relating to web applications, including executable code of web applications that is obtained by, and subsequently executed by, client devices 102A-102N. Additionally or alternatively, database 128 may store code for extension modules 114A-114N and/or user settings relating to extensions, including indications of which extensions are enabled by a user and any configuration settings for extensions.

Extension repository 130 includes a network interface (I/F) 132, at least one processor 134, and a database 136. Extension repository 130 may include a rack-mounted server, or any other programmable electronic device capable of executing computer readable program instructions. Network interface 132 enables components of extension repository 130 to send and receive data over a network, such as network 138. In general, extension repository 130 stores and provides extensions for web applications, including extensions provided by developers of web applications and third-party extensions. Extension repository 130 may include internal and external hardware components, as depicted and described in further detail with respect to FIG. 8.

Database 136 may include any non-volatile storage media known in the art. For example, database 136 can be implemented with a tape library, optical library, one or more independent hard disk drives, or multiple hard disk drives in a RAID. Similarly, data in database 136 may conform to any suitable storage architecture known in the art, such as a file, a relational database, an object-oriented database, and/or one or more tables. Database 136 may store data that includes code for extension modules 114A-114N, which database 136 provides, or makes available to, a requesting web application.

Network 138 may include a local area network (LAN), a wide area network (WAN) such as the Internet, or a combination of the two, and includes wired, wireless, or fiber optic connections. In general, network 138 can be any combination of connections and protocols known in the art that will support communications between client devices 102A-102N, application server 118, and/or extension repository 130 via their respective network interfaces in accordance with the described embodiments.

Figure 2:
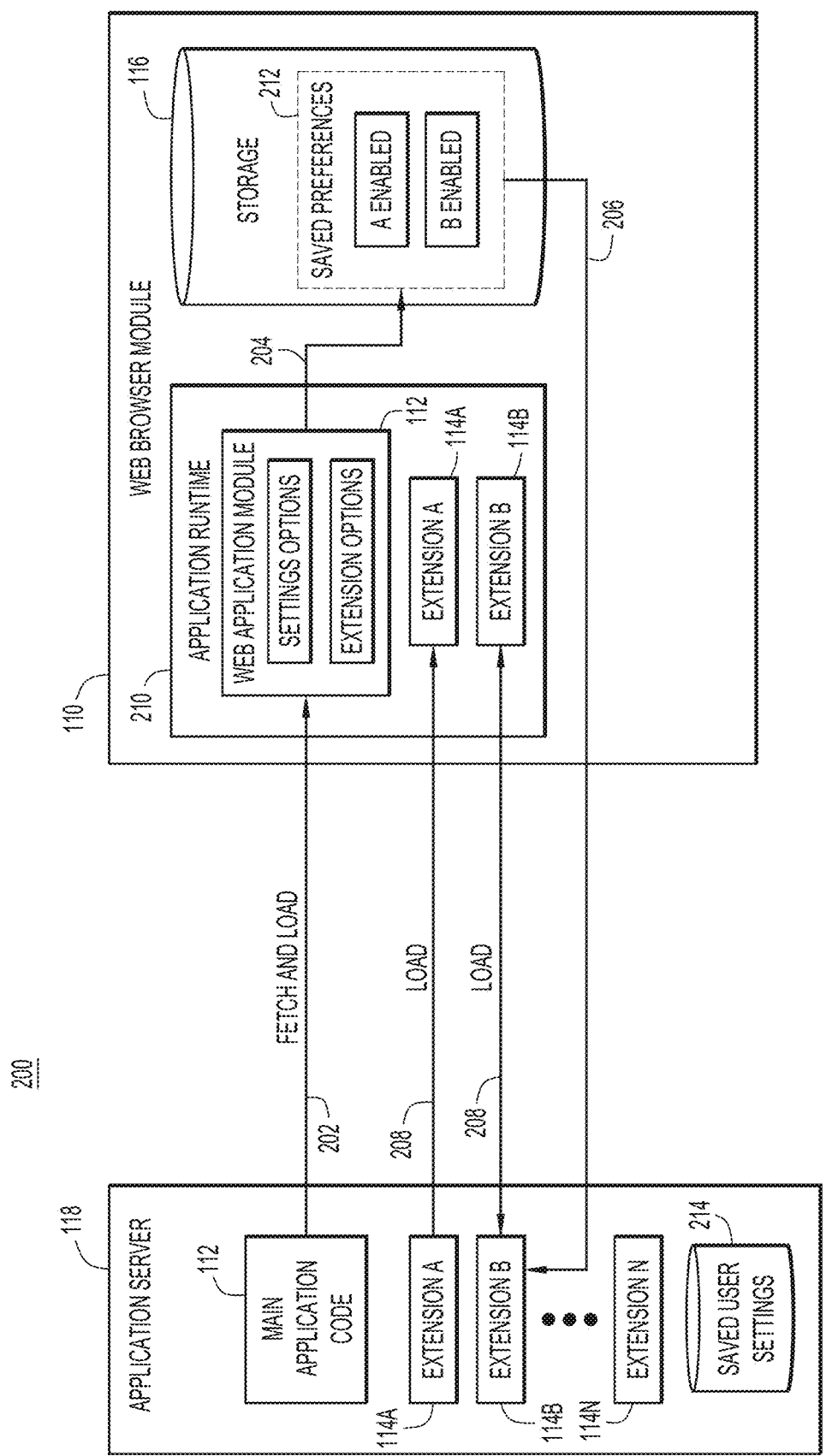
FIG. 2 is a block diagram depicting an environment for loading of an extension into a single-page web application, in accordance with an example embodiment.

Referring to FIG. 2, FIG. 2 is a block diagram depicting an environment 200 for loading of an extension into a single-page web application in accordance with an example embodiment. As depicted, environment 200 includes web browser module 110 and application server 118 (which are also depicted and described with reference to FIG. 1).

Initially, main application code for web application module 112 is fetched from application server 118 and loaded by web browser module 110 at operation 202. Web application module 112 may be loaded into application runtime 210, which can be hosted in memory 108 of any of client devices 102A-102N along with web browser module 110.

At operation 204, web application module 112 accesses user settings (Saved Preferences) 212 that are stored in storage 116 of client devices 102A-102N in order to obtain settings options for web application module 112 and extension options, which identify enabled extensions as well as any user-specified extension options, such as configuration settings for each extension. User settings 212 may be retrieved from a backup 214 of user settings, stored by application server 118 in the event that a user's local settings are inaccessible or the user accesses web application module 112 from a new device.

At operation 206, web browser module 110 requests the extensions that are indicated as enabled according to user settings 212. In the depicted example, extension modules 114A and 114B are requested from application server 118. The code for extension modules 114A and 114B are retrieved and loaded at operation 208. Thus, extensions are automatically fetched based on the user settings. When an extension is loaded into application runtime 210, the extension's code is injected into web application module 112 to modify the page of web application module 112 without requiring the page to be reloaded.

Figure 3:
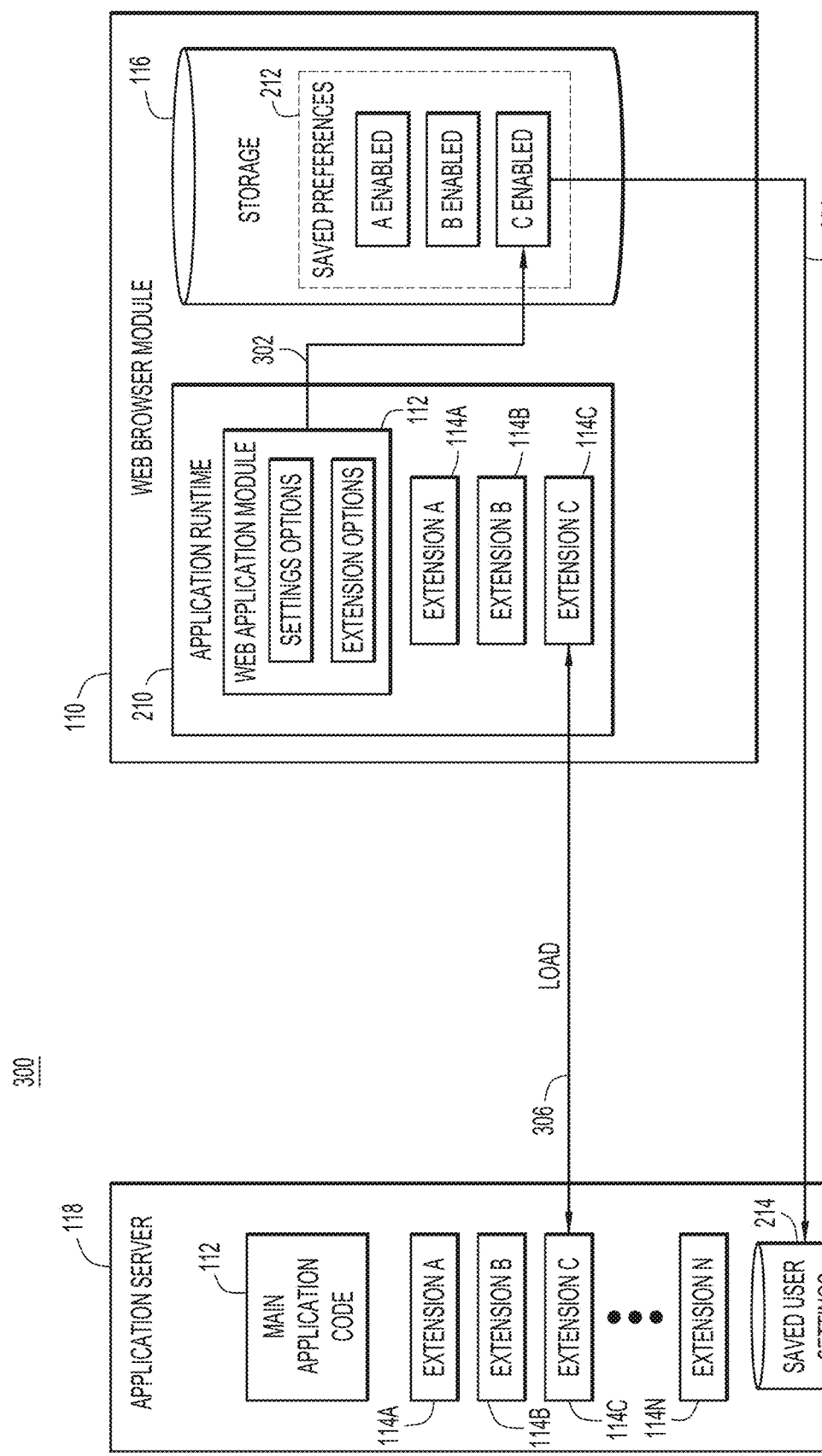
FIG. 3 is a block diagram depicting an environment of a single-page web application at runtime, in accordance with an example embodiment.

Referring to FIG. 3, FIG. 3 is a block diagram depicting an environment 300 of a single-page web application at runtime in accordance with an example embodiment. As depicted, environment 300 includes web browser module 110 and application server 118 (which are also depicted and described with reference to FIG. 1).

Initially, the main code of web application module 112 and extension modules 114A-114C execute in application runtime 210. When a user modifies a setting of web application module 112, modifies an extension setting, or enables or disables an extension, user settings 212 are updated accordingly at operation 302. For example, a user may enable extension 114C, which was previously disabled or was never requested by the user.

In response to the modified user settings, web browser module 110 indicates the modification to application server 118 at operation 304. Application server 118 may update the backup 214 of user settings to match the updated user settings 212. Application server 118 may process the modified user settings to identify the changes and determine actions to be performed accordingly. For example, when the modified user settings indicate that the user has requested a new extension, extension 114C, to be enabled, application server 118 provides the new extension to the client web browser (e.g., web browser module 110). Thus, a new extension is loaded into application runtime 210 of web browser module 110 at operation 306. The newly-loaded extension may inject code into web application module 112 to modify features of the web application without causing the page of the web application to be reloaded. Similarly, when a user disables an extension, the corresponding code is removed from web application module 112, reverting any modifications caused by the extension without necessitating a page reload.

Figure 4:
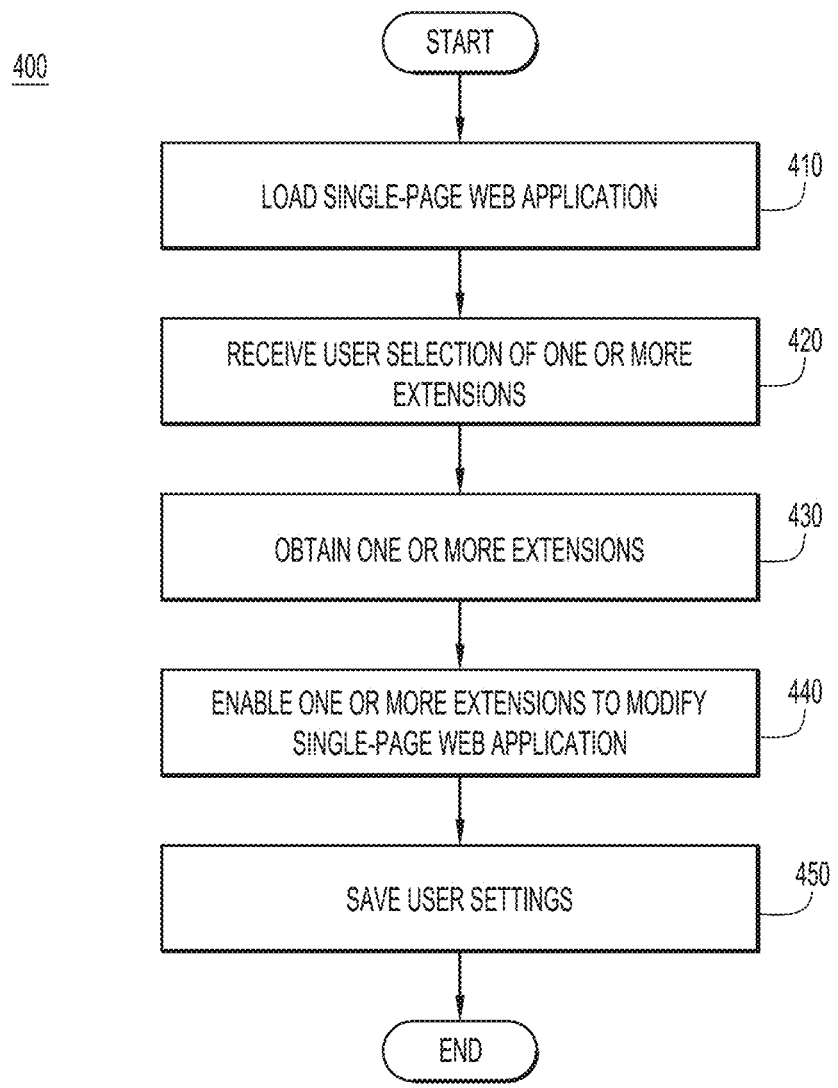
FIG. 4 is a flow chart depicting a method for implementing an extension in a single-page web application, in accordance with an example embodiment.

Referring to FIG. 4, FIG. 4 is a flow chart depicting a method 400 for implementing an extension in a single-page web application, in accordance with an example embodiment. Reference is also made to FIGS. 1-3 for purposes of the description of FIG. 4.

A single-page web application is loaded at operation 410. The single-page web application may be fetched from a server, such as application server 118, and executed by a browser, such as web browser module 110 of any of client devices 102A-102N. Web application module 112 may present data by loading a page of web browser module 110 as a user interface. Web application module 112 may receive user input that can be transmitted to application server 118 in order to process user requests, and may dynamically update the page of web browser module 110 containing data received from application server 118.

A user selection of one or more extensions is received at operation 420. The user may provide input to web browser module 110 to indicate one or more extensions that the user would like to enable. In some embodiments, the user may access an app store or repository in which the user can search for, or otherwise browse through, available extensions.

The one or more extensions are obtained at operation 430. Web browser module 110 may receive code corresponding to extension modules 114A-114N from a network-accessible resource, such as application server 118 and/or extension repository 130.

The one or more extensions are enabled to modify the single-page web application at operation 440. Extension modules 114A-114N may be executed in the same runtime environment as web application module 112, and can add, remove, or otherwise modify any features of web application module 112. Each extension may additionally include user-configurable settings or parameters that enable a user to modify aspects of the extension itself. In some embodiments, an extension modifies aspects of web application module 112 by injecting code, such as JavaScript, or inserting a new HTML DOM element. Changes caused by extension modules 114A-114N occur without necessitating web browser module 110 to perform a page reload operation. Similarly, when an extension is disabled, the modifications caused by the extension are reverted without performing a page reload operation, and if an extension encounters an error, execution of the extension can be terminated without disrupting operation or execution of web application module 112.

User settings are saved at operation 450. The user settings may include a listing of enabled extensions and any extension settings. User settings can be saved locally in storage 116 of any of client devices 102A-102N. Additionally or alternatively, user settings can be stored in database 128 of application server 118 so that the user settings can be automatically accessed when the user logs into another client device 102A-102N and initiates web application module 112, thus causing enabled extensions to likewise be applied automatically.

Figure 5:
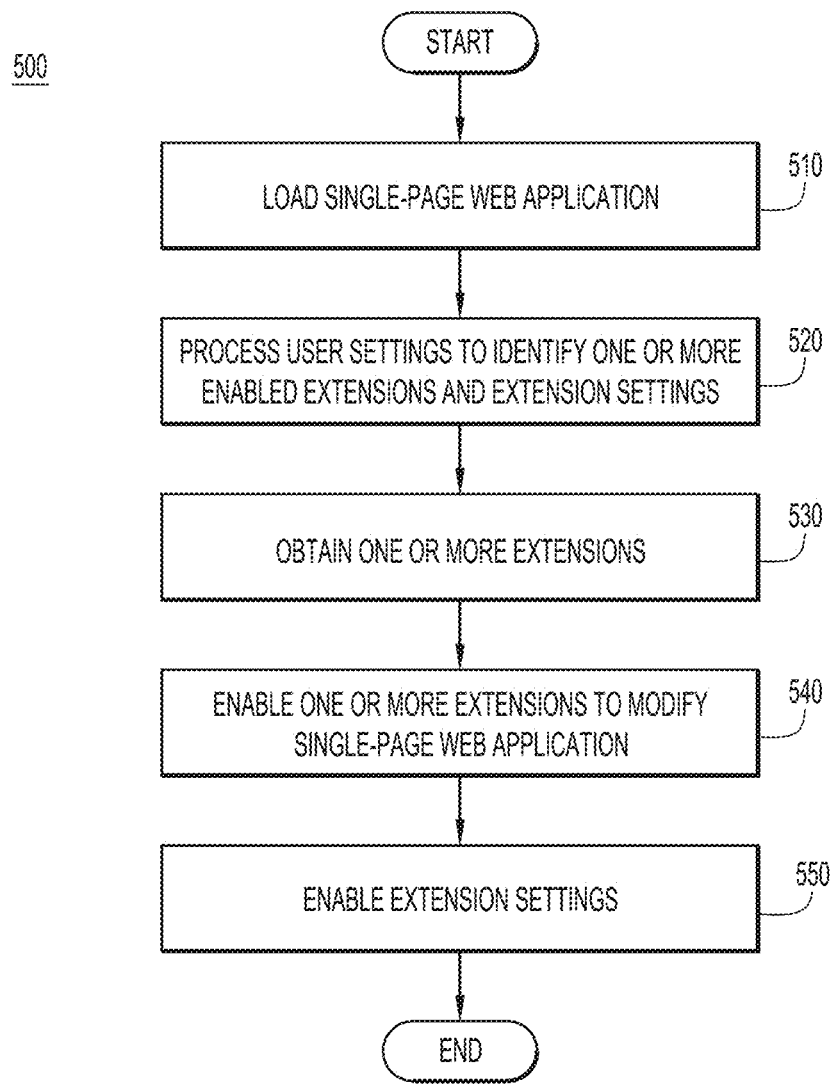
FIG. 5 is a flow chart depicting a method for automatically loading an extension, in accordance with an example embodiment.

Referring to FIG. 5, FIG. 5 is a flow chart depicting a method 500 for automatically loading an extension in accordance with an example embodiment. Again, reference is made to FIGS. 1-3 for purposes of the description of FIG. 5.

A single-page web application is loaded at operation 510. The single-page web application may be fetched from a server, such as application server 118, via a browser that also executes the application, such as web browser module 110 of any of client devices 102A-102N.

User settings are processed to identify one or more enabled extensions and corresponding extension settings at operation 520. The user settings may be currently stored on the device of the browser, or may be fetched from a server. For example, user settings may be stored in storage 116 of any of client devices 102A-102N. However, if a user initiates web application module 112 on a device on which the user's settings are not stored, then the device can obtain user settings from database 128 of application server 118. User settings may be linked to the user authenticating on, or otherwise providing a form of unique identification to, a new device of client devices 102A-102N.

The one or more extensions are obtained at operation 530. Web browser module 110 may receive code corresponding to extension modules 114A-114N from a network-accessible resource, such as application server 118 and/or extension repository 130.

The one or more extensions are enabled to add or modify features of the single-page application at operation 540. Extension modules 114A-114N may be executed in the same runtime environment as web application module 112, and can add, remove, or otherwise modify any features of web application module 112. Each extension may additionally include user-configurable settings or parameters that enable a user to modify aspects of the extension itself. Thus, extensions are automatically obtained and enabled according to the user settings associated with a user during any user session on any device (e.g., client devices 102A-102N), and/or on any browser of a device.

When an extension is enabled, extension settings are enabled at operation 550. Any user-specific configuration settings may also be applied to web application module 112. The extension settings may be identified in the user settings that are stored locally on the client device 102A-102N currently used by the user and/or obtained from database 128 of application server 118. When a user enables or disables an extension, or specifies or modifies extension settings, the user settings are updated so that the current user experience will be recreated when the user initiates a subsequent session with web application module 112.

Figure 6:
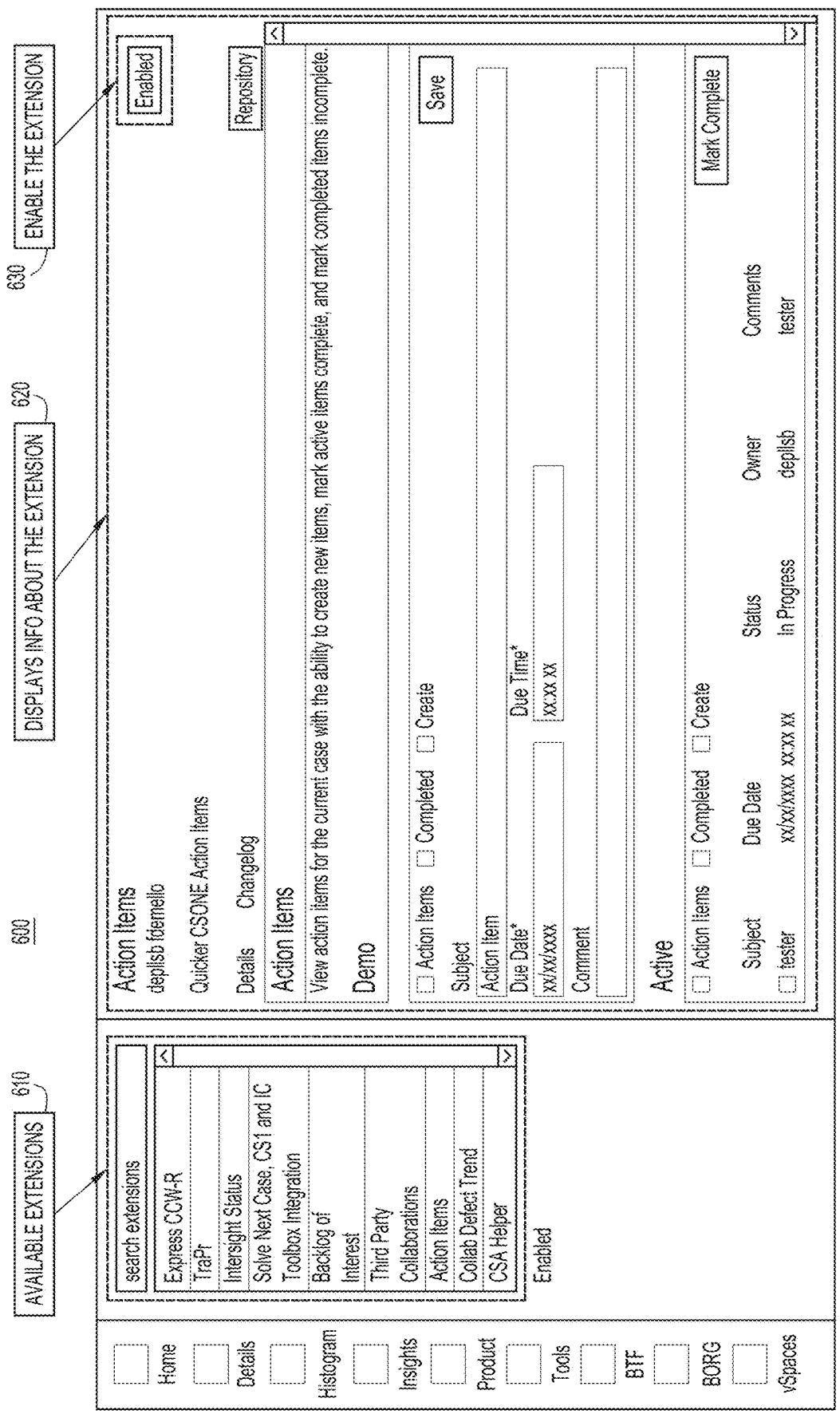
FIG. 6 is a view depicting a user interface in accordance with an example embodiment.

Referring to FIG. 6, FIG. 6 is a view depicting a user interface 600 in accordance with an example embodiment. User interface 600 may be presented via a web page of a browser, such as web browser module 110. As depicted, user interface 600 includes an available extensions element 610, an extension information element 620, and an extension toggle element 630.

User interface 600 may present an "App Store" or similar user-navigable repository of single-page web application extensions. Each extension may be obtained from a network-accessible location, such as database 128 of application server 118 and/or database 136 of extension repository 130. Available extensions element 610 may indicate a list of extensions that are compatible with one or more web applications of a user, such as web application module 112, and extension information element 620 may present information relating to each extension, such as version information, features, available extension options, compatibility details, and the like. When a user desires to enable or disable a selected extension, the user can activate extension toggle element 630. Activating or deactivating an extension causes the extension to be added to, or removed from, its single-page web application (e.g., web application module 112) without causing a reload operation of the page in which the web application is being presented.

Figure 7:
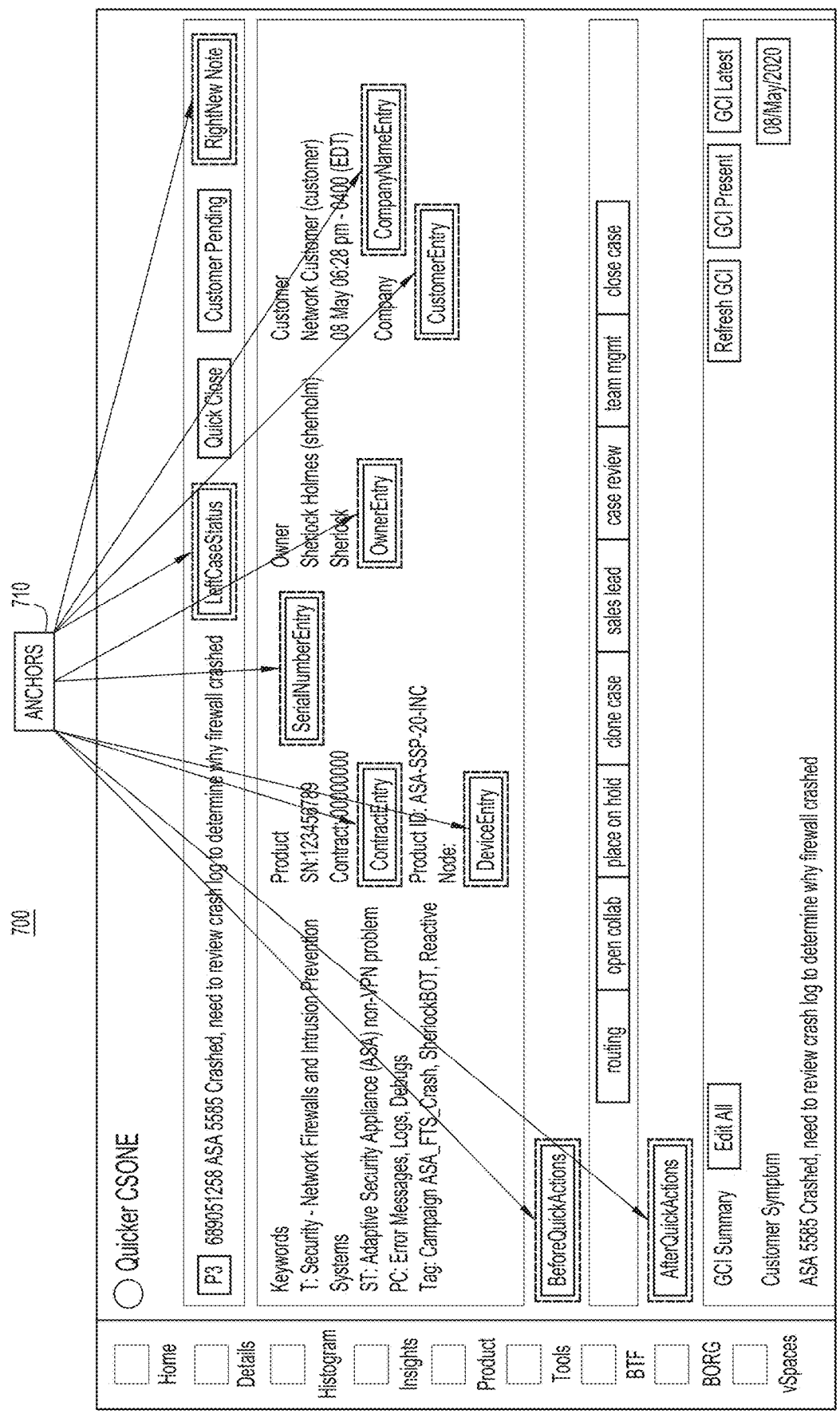
FIG. 7 is a view depicting a user interface of a single-page web application, in accordance with an example embodiment.

Referring to FIG. 7, FIG. 7 is a view depicting a user interface 700 of a single-page web application in accordance with an example embodiment. As presented, user interface 700 includes a plurality of anchor elements 710 that are available for modification by extensions, including third-party extensions. Each anchor element 710 may expose the single-page web application to modification by extensions, and may thus represent points in the user interface 700 at which an extension's code can be injected into the single-page web application.

Figure 8:
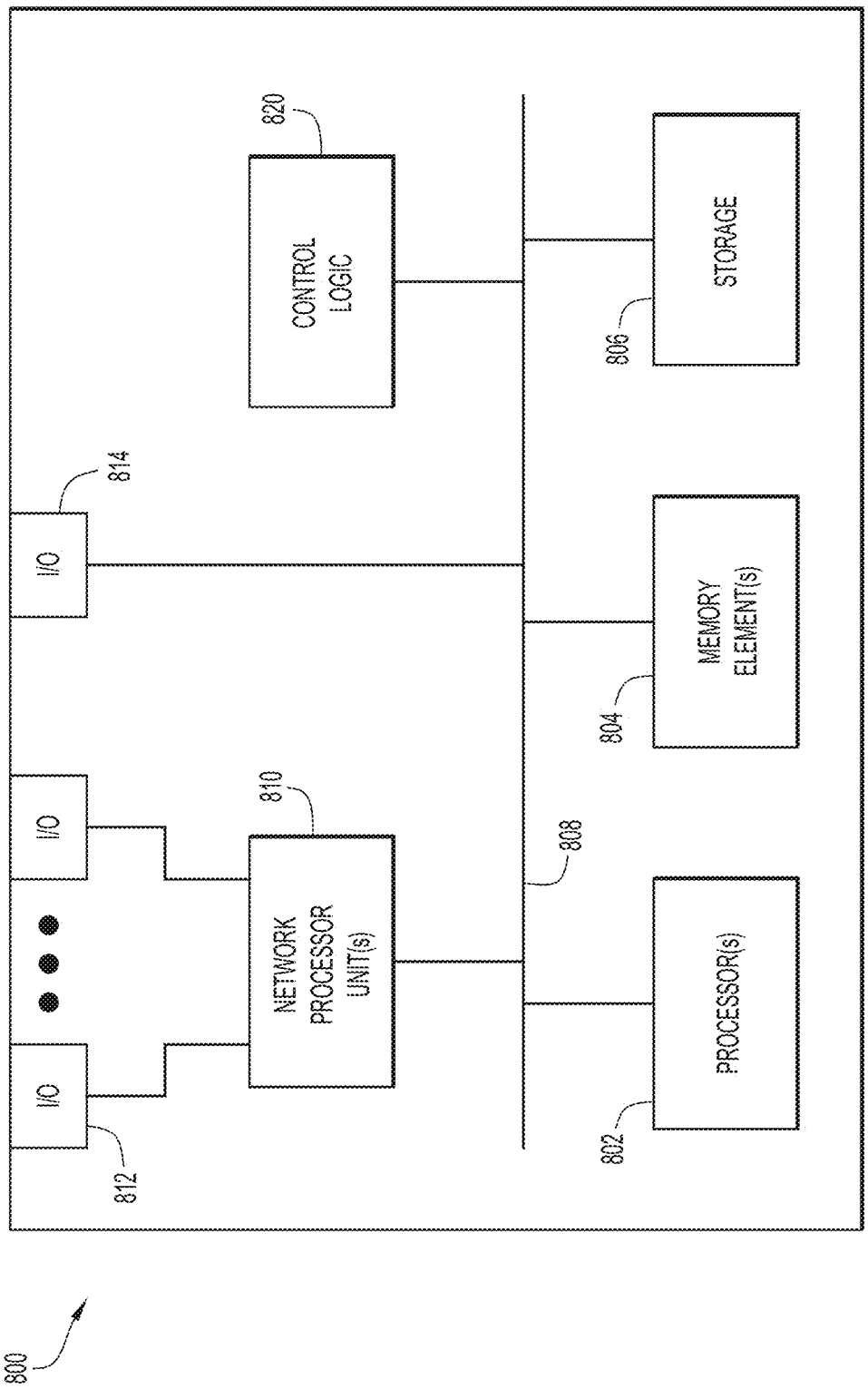
FIG. 8 is a block diagram depicting a computing device configured to modify a web application at runtime, in accordance with an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device, such as computing device 800 or any combination of computing devices 800, may be configured as any entity/entities as discussed for the techniques depicted in connection with FIGS. 1-7 in order to perform operations of the various techniques discussed herein.

In at least one embodiment, the computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computer device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass computing elements (which can include virtualized network elements, functions, etc.) such as, for example, laptop computers, tablet computers, netbook computers, personal computers (PCs), desktop computers, personal digital assistants (PDAs), smart phones, thin clients, network appliances, forwarders, routers, servers, switches, gateways, bridges, load balancers, firewalls, processors, modules, radio receivers/transmitters, or any other suitable device, component, element, or object operable to exchange information or execute computer readable program instructions as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The programs described herein are identified based upon the application for which they are implemented in a specific embodiment. However, it should be appreciated that any particular program nomenclature herein is used merely for convenience, and thus the described embodiments should not be limited to use solely in any specific application identified and/or implied by such nomenclature.

In one form, a method is provided comprising: loading, by a web browser of a client, a single-page web application, wherein the single-page web application exchanges data between the client and a server, obtaining an extension for the single-page web application, and applying the extension to the single-page web application, wherein applying the extension adds a new feature, or modifies an existing feature, of the single-page web application without reloading the single-page web application.

In another form, the method further includes obtaining the extension is based on a user setting, and is performed automatically in response to loading the single-page web application.

In another form, the method further includes obtaining the extension from the server that exchanges data with the client, or from another server.

In another form, the extension includes JavaScript code, and wherein applying the extension to the single-page web application comprises injecting the JavaScript code into the single-page web application at runtime.

In another form, applying the extension adds a new hypertext markup language (HTML) Document Object Model (DOM) node into the single-page web application.

In another form, the single-page web application comprises one or more anchor elements, and wherein applying the extension comprises injecting code of the extension into the one or more anchor elements.

In another form, applying comprises adding the new feature by adding a new user interface element.

In another form, applying comprises modifying the existing feature comprises by modifying an existing user interface element In one form, a computer system is provided, comprising: one or more computer processors; one or more computer readable storage media; program instructions stored on the one or more computer readable storage media for execution by at least one of the one or more computer processors, the program instructions comprising instructions to: load, by a web browser of a client, a single-page web application, wherein the single-page web application exchanges data between the client and a server, obtain an extension for the single-page web application, and apply the extension to the single-page web application, wherein applying the extension adds a new feature, or modifies an existing feature, of the single-page web application without reloading the single-page web application.

In one form, one or more computer readable storage media is provided, the one or more computer readable storage media collectively having program instructions embodied therewith, the program instructions executable by a computer to cause the computer to: load, by a web browser of a client, a single-page web application, wherein the single-page web application exchanges data between the client and a server, obtain an extension for the single-page web application, and apply the extension to the single-page web application, wherein applying the extension adds a new feature, or modifies an existing feature, of the single-page web application without reloading the single-page web application.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   loading, by a web browser of a client, a single-page web application, wherein the single-page web application exchanges data between the client and a server;
   obtaining an extension for the single-page web application, wherein obtaining the extension is based on user settings, and is performed automatically in response to loading the single-page web application, and wherein the user settings are processed to identify one or more extensions to be enabled and corresponding extension settings; and
   in response to enabling the extension, applying the extension to the single-page web application, wherein applying the extension modifies the single-page web application by dynamically rewriting the single-page web application without reloading the single-page web application, wherein the extension is automatically implemented on one or more other devices and/or browsers of a user.

2. The computer-implemented method of claim 1, wherein obtaining the extension comprises obtaining the extension from the server that exchanges data with the client, or from another server.

3. The computer-implemented method of claim 1, wherein the extension includes JavaScript™ code, and wherein applying the extension to the single-page web application comprises injecting the JavaScript™ code into the single-page web application at runtime.

4. The computer-implemented method of claim 1, wherein applying the extension adds a new hypertext markup language (HTML) Document Object Model (DOM) node into the single-page web application.

5. The computer-implemented method of claim 1, wherein the single-page web application comprises one or more anchor elements, and wherein applying the extension comprises injecting code of the extension into the one or more anchor elements.

6. The computer-implemented method of claim 1, wherein applying comprises adding a new feature by adding a new user interface element.

7. The computer-implemented method of claim 1, wherein applying comprises modifying an existing feature comprises by modifying an existing user interface element.

8. The method of claim 1, further comprising:
   in response to disabling the extension, reverting the applying of the extension to the single-page web application by dynamically rewriting the single-page web application without reloading the single-page web application.

9. A computer system comprising:
   one or more computer processors;
   one or more non-transitory computer readable storage media; and
   program instructions stored on the one or more non-transitory computer readable storage media for execution by at least one of the one or more computer processors, the program instructions comprising instructions to perform operations including:
   loading, by a web browser of a client, a single-page web application, wherein the single-page web application exchanges data between the client and a server;
   obtaining an extension for the single-page web application, wherein obtaining the extension is based on user settings, and is performed automatically in response to loading the single-page web application, and wherein the user settings are processed to identify one or more extensions to be enabled and corresponding extension settings; and
   in response to enabling the extension, applying the extension to the single-page web application, wherein applying the extension modifies the single-page web application by dynamically rewriting the single-page web application without reloading the single-page web application, wherein the extension is automatically implemented on one or more other devices and/or browsers of a user.

10. The computer system of claim 9, wherein the instructions for obtaining the extension comprise instructions to obtain the extension from the server that exchanges data with the client, or from another server.

11. The computer system of claim 9, wherein the extension includes JavaScript™ code, and wherein the instructions for applying the extension to the single-page web application comprise instructions to inject the JavaScript™ code into the single-page web application at runtime.

12. The computer system of claim 9, wherein the instructions for applying the extension include instructions to add a new hypertext markup language (HTML) Document Object Model (DOM) node into the single-page web application.

13. The computer system of claim 9, wherein the single-page web application comprises one or more anchor elements, and wherein the instructions for applying the extension comprises instructions to inject code of the extension into the one or more anchor elements.

14. The computer system of claim 9, wherein the instructions for applying comprise instructions for adding a new feature by adding a new user interface element.

15. The computer system of claim 9, wherein the instructions for applying comprise instructions for modifying an existing feature by modifying an existing user interface element.

16. The computer system of claim 9, wherein the program instructions further include instructions to:
in response to disabling the extension, revert the applying of the extension to the single-page web application by dynamically rewriting the single-page web application without reloading the single-page web application.

17. A computer program product comprising one or more non-transitory computer readable storage media collectively having program instructions embodied therewith, the program instructions executable by a computer to cause the computer to perform operations including:
loading, by a web browser of a client, a single-page web application, wherein the single-page web application exchanges data between the client and a server;
obtaining an extension for the single-page web application, wherein obtaining the extension is based on user settings, and is performed automatically in response to loading the single-page web application, and wherein the user settings are processed to identify one or more extensions to be enabled and corresponding extension settings; and
in response to enabling the extension, applying the extension to the single-page web application, wherein applying the extension modifies the single-page web application by dynamically rewriting the single-page web application without reloading the single-page web application, wherein the extension is automatically implemented on one or more other devices and/or browsers of a user.

18. The computer program product of claim 17, wherein the instructions for obtaining the extension causes the computer to obtain the extension from the server that exchanges data with the client, or from another server.

19. The computer program product of claim 17, wherein the extension includes JavaScript™ code, and wherein the instructions for applying the extension to the single-page web application comprise instructions to inject the JavaScript™ code into the single-page web application at runtime.

20. The computer program product of claim 17, wherein the instructions further cause the computer to:
in response to disabling the extension, revert the applying of the extension to the single-page web application by dynamically rewriting the single-page web application without reloading the single-page web application.

\* \* \* \* \*